(12) United States Patent
Gil

(10) Patent No.: US 6,450,195 B1
(45) Date of Patent: Sep. 17, 2002

(54) TOILET TANK FILL VALVE WITH FLOAT

(75) Inventor: Amos Gil, F. Hills, MI (US)

(73) Assignee: Brass-Craft Manufacturing Company, Novi, MI (US)

( * ) Notice: Subject to any disclaimer, the term of this patent is extended or adjusted under 35 U.S.C. 154(b) by 0 days.

(21) Appl. No.: 09/442,949

(22) Filed: Nov. 18, 1999

Related U.S. Application Data

(60) Provisional application No. 60/133,776, filed on May 12, 1999.

(51) Int. Cl.⁷ .......................... F16K 31/34; F16K 33/00
(52) U.S. Cl. ..................... 137/414; 137/426; 137/432; 137/437; 137/444
(58) Field of Search ................ 137/414, 426, 137/432, 436, 437, 444; 251/45, 46, 61.1

(56) References Cited

U.S. PATENT DOCUMENTS

| | | | | |
|---|---|---|---|---|
| 2,228,552 A | * | 1/1941 | Arbogast | 137/414 |
| 2,588,242 A | * | 3/1952 | Hunter | 137/414 |
| 2,619,122 A | * | 11/1952 | Hunter | 137/414 |
| 3,194,258 A | * | 7/1965 | Grant | 137/414 |
| 3,429,333 A | * | 2/1969 | Schoepe et al. | 137/414 |
| 3,495,803 A | * | 2/1970 | Schoepe et al. | 137/414 |
| 3,554,219 A | * | 1/1971 | Hudson | 137/414 |
| 3,669,138 A | * | 6/1972 | Schoepe et al. | 137/218 |
| 3,729,017 A | * | 4/1973 | Brandelli | 137/414 |
| 4,100,928 A | | 7/1978 | Schoepe | 137/414 |
| 4,562,859 A | | 1/1986 | Shames | 137/414 |
| 4,632,142 A | | 12/1986 | Shames et al. | 137/437 |
| 5,738,141 A | * | 4/1998 | Blanke et al. | 137/414 |
| 5,904,176 A | * | 5/1999 | Li | 137/434 |

FOREIGN PATENT DOCUMENTS

| | | | |
|---|---|---|---|
| SE | 102794 | * 10/1941 | 137/414 |

* cited by examiner

*Primary Examiner*—George L. Walton
(74) *Attorney, Agent, or Firm*—Edgar A. Zarins; Lloyd D. Doigan

(57) ABSTRACT

A fill valve assembly for a toilet tank including a vertical standpipe, a pilot valve assembly located at the top end of the standpipe, and a vertically movable float which is connected to the pilot valve assembly. The pilot valve assembly opens the valve assembly when the float moves vertically downward and closes the valve assembly when the float moves vertically upward.

11 Claims, 3 Drawing Sheets

TOILET TANK FILL VALVE WITH FLOAT

RELATED APPLICATIONS

This application claims priority from U.S. Provisional Application No. 60/133,776 filed on May 12, 1999.

BACKGROUND OF THE INVENTION

I. Field of the Invention

The instant invention relates to fill valves with floats, and, in particular, to toilet tank fill assembly having a float and a pilot operated fill valve.

II. Description of the Prior Art

Toilet tank fill valves with ballcocks are well known and in common usage. However, the conventional valve assemblies have suffered from several disadvantages, including noise, clogging of the diaphragm valve due to foreign bodies, unwieldy design due to the presence of a conventional ballcock, and sluggish action of conventional ballcocks. Prior known toilet fill valves may employ a ball float depending from an actuator arm or a float reciprocally mounted to the mounting tube for actuation of the fill valve when the fluid level drops below a predetermined level. As the water level reaches a full position, the buoyancy of the float will cause the fill valve to shut off. It is desirable for the valve to fill the reservoir as quickly as possible by maintaining a near maximum fluid flow until shut off of the valve.

In order to accommodate different tank sizes, particularly tank depths, the fill valves are provided with means for adjusting the position of the valve and/or flat. Early fill valves merely adjusted the angle of the actuator arm associated with the ball float. However, such assemblies do not accommodate the position of the fill valve in different tanks. More recently, fill assemblies have been provided with adjustable fill tubes to optimize the position of the fill valve for proper height and to prevent back siphoning through the valve. However, these adjustment assemblies have been found to be awkward and clumsy, in some instances, requires removal from the tank to adjust the length of the standpipe.

SUMMARY OF THE PRESENT INVENTION

The present invention overcomes the disadvantages of the prior known reservoir fill assemblies by providing an efficient fill valve for filling the tank and incorporating a pilot operated valve for efficient operation.

The invention relates to a diaphragm water level control valve with a float for use in tanks such as flush tanks for toilets. The valve is mounted on the upper end of a vertical standpipe through which flush water is supplied. An outlet or discharge tube surrounds the standpipe and is concentric therewith. The diaphragm valve member is disposed at the top or upper end of the standpipe and functions to open and close the water inlet passage in the standpipe. The diaphragm valve member is disposed in a housing and together with the housing defines a vent valve chamber above the diaphragm.

The top wall of the housing has a vent port with a pilot valve disposed in the pilot valve chamber for opening and closing the vent port. The pilot valve includes a valve head which engages a valve seat to seal the vent port, and a stem portion which extends axially through said vent port.

A float member is generally an inverted cup shape and is slidably mounted on the discharge pipe. The float is linked to a stem actuator member which is pivotally mounted on the housing. When the water level in the tank drops, as for example when the toilet is flushed, the float member drops and the pilot valve member is unseated from the pilot aperture. The pilot valve is displaced and the vent port opened allowing the water pressure at the inlet tube to open the diaphragm valve. When the water level in the tank rises it will carry the float with it. The stem actuator member then disengages the stem, and the pilot valve is axially displaced to close the vent port.

The fill valve assembly is also provided with means for adjusting the length of the standpipe to accommodate different tank depths. The standpipe includes mating inlet and outlet tubes which direct water to the fill valve and into the tank, respectively. The fixed outlet tube incorporates a plurality of discrete camming grooves defining the positions of adjustment. The slidable outlet tube has a set of slots adapted to receive a flexible locking clip which selectively engages the camming grooves of the fixed tube to lock the slidable tube relative to the fixed tube. The locking clip is movable between a retracted position allowing adjustment of the standpipe and an inserted position preventing movement. The adjustment assembly provides convenient adjustment yet positive locking against movement.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
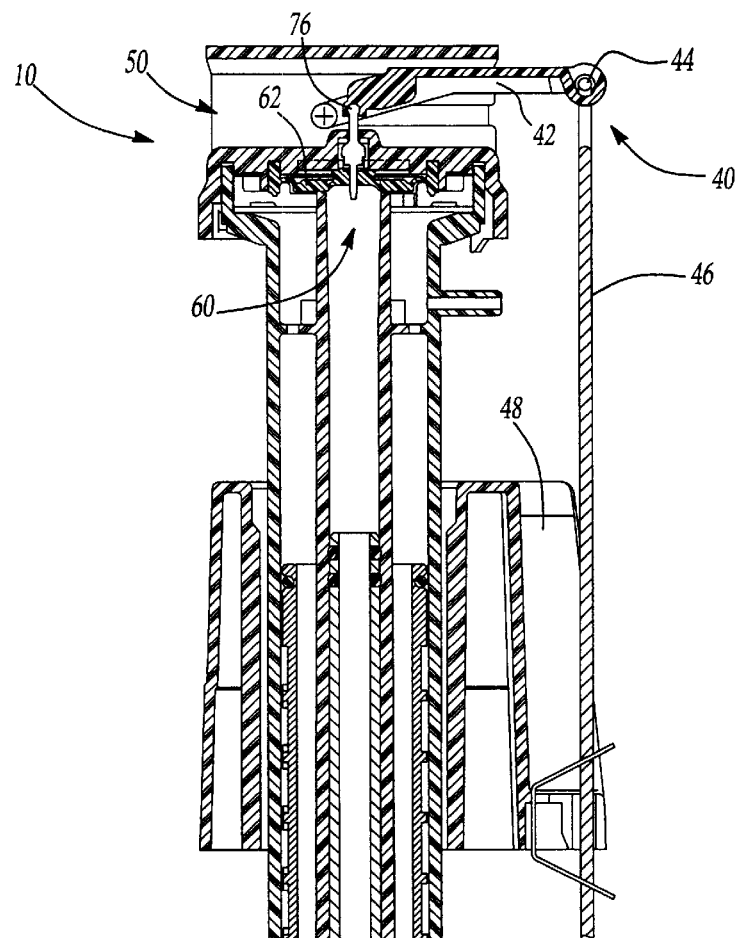
FIG. 1 is a side elevational view in section of the complete fill assembly embodying the instant invention showing the valve in the closed position.
Figure 1:
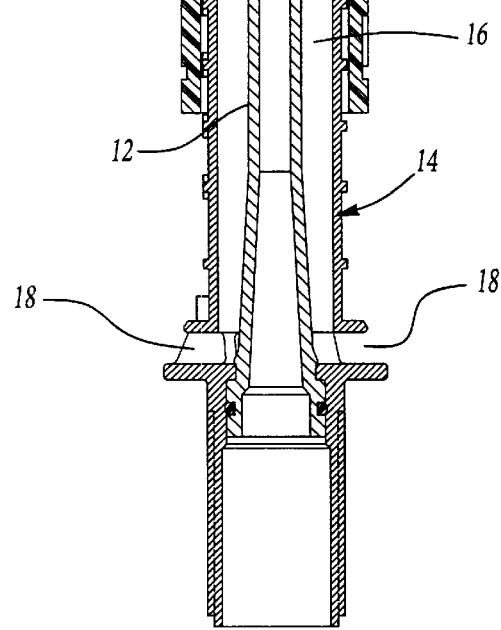

Referring to the drawing, there is shown a float operated valve assembly 10 for controlling the filling of a reservoir such as a toilet tank and to direct fluid for flushing upon actuation. As is well known, upon actuation of a toilet flush lever, the water from the toilet tank is directed to the bowl for removal of waste. The valve assembly 10 controls the filling of the toilet tank to prepare for the next flush.

The float operated valve assembly 10 of the instant invention includes a valve housing 50 connected to and in communication with a height adjustable vertical standpipe 12 and water discharge pipe 14. Water discharge pipe 14 has a larger diameter than standpipe 12 and surrounds and is concentric with standpipe 12. In the embodiment illustrated in the drawings the standpipe 12 and water discharge pipe 14 are of coaxial construction. Discharge pipe 14 has a discharge passage 16 and includes discharge ports 18 through which water can exit the discharge passage 16 and flow into a tank.

The float operated valve assembly of the instant invention is disposed in a conventional tank which is associated with a conventional flush toilet having a conventional flush valve assembly. The conventional flush valve assembly generally includes a flapper valve operated by a flush tank handle normally located in the tank and operably connected to the flapper valve. A stem actuator member 40 is mounted on the top of housing 50. Actuator 40 has an actuator arm 42 which is pivotably mounted to the housing 50. The actuator arm 42 is pivotally connected at its other end 44 to a downwardly extending link 46. Link 46 is connected to float 48. Float 48 is generally of an inverted cup shape which is at least partially filled with air and, therefore, buoyant in the water tank. The float comprises a central tubular section vertically slidable on discharge tube 14.

Figures 2, 3:
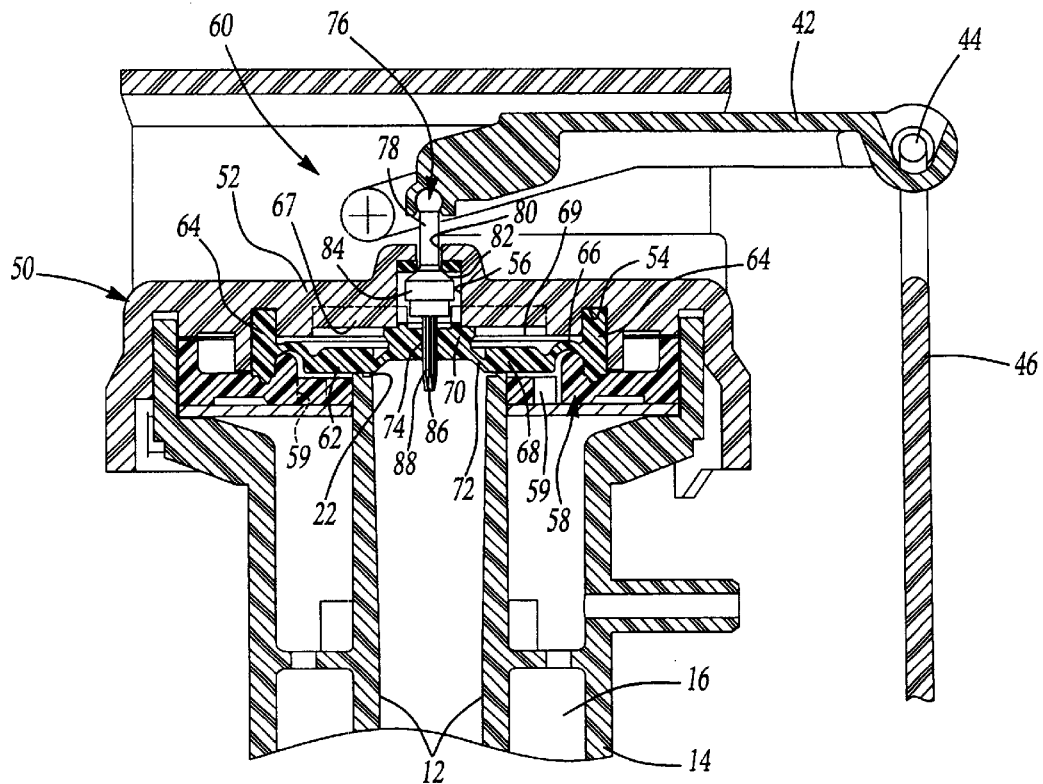
FIG. 2 is an enlarged fragmentary side elevational view in section showing the pilot valve assembly in the closed position.
FIG. 3 is a view similar to FIG. 2 except that the pilot valve is in the open position and the float is at a level lower.

As is best shown in FIG. 2, the fill valve assembly 60 generally includes a diaphragm valve member 62 seated in and sealing the opening 22 at the top of pipe 12 to selectively prevent fluid flow from the inlet pipe 12. The diaphragm valve member 62 is generally disk shaped and is made of a flexible material such as rubber, polyurethane, and the like.

The diaphragm member 62 is captured within the housing 50 having an upper wall 52 in cooperation with the standpipe 12, 14 to enclose the valve 60. The diaphragm member 62 engages the upper wall 52 to be seated against the inlet pipe 12 to control fluid flow. The diaphragm 62 includes an outer annular flange 64 which is received in a corresponding annular groove 54 in the housing wall 52. A flexible annular web 66 is disposed radially inwardly from the flange 64 which facilitates movement of an annular disc 68 of the diaphragm 62 between an open and closed position. The center of the diaphragm 62 includes a central hub 70 which is connected to the annular disc 68 by a second flexible web 72. The central hub 70 is seated against a plurality of ribs 67 of the housing wall 52 and includes an axial aperture 74. The ribs extend radially outwardly from the central passageway 56 allowing a predetermined volume of water to pass by the diaphragm hub 70 to the central passageway 56.

In order to positionally maintain the diaphragm 62 within the housing 50, an annular ring 58 is positioned in the upper end of outer discharge tube 14. The ring 58 forms a support platform for the diaphragm 62 and includes a central aperture 59 to allow fluid flow into the discharge tube 14.

A pilot valve 76 is disposed within the housing 50. The pilot valve 76 is operationally connected to the actuator arm 42 and includes a reciprocally movable pilot stem 78 disposed within the central passageway 56 of the housing wall 52. The housing wall 52 includes a vent port 80 having a vent seat 82. The pilot stem 78 extends through the vent port 80 for connection to the actuator arm 42. The pilot stem 78 includes a valve head 84 which is selectively engageable with the vent seat 82 to prevent flow through the vent port 80 as will be subsequently described in connection with operation of the present invention.

A downwardly depending secondary stem 86 extends from the valve head 84 through the aperture 74 of the diaphragm hub 70. The secondary stem 86 includes a plurality of longitudinal grooves 88 which allow fluid flow past the stem 86 through the aperture 74 of the diaphragm 62. The pilot valve 76 is reciprocally movable relative to the diaphragm 62 allowing the stem 86 to move through the aperture 74.

The operation of the float operated vent assembly will now be described. When the toilet tank is filled and the pilot valve chamber 69 above the diaphragm 62 is filled with water, the pilot valve member 62 is in the closed position as illustrated in FIGS. 1 and 2. In this closed position the float 48 is in a raised position thereby raising the actuator arm 42 connected to the pilot stem 78 which closes the vent port 80, thereby closing off the flow of water out of the pilot valve chamber through vent port 80. The diaphragm valve member 62 is, at this point, also in the closed position as illustrated in FIGS. 1 and 2. As best seen in FIGS. 1–4 the surface area on the top side of the diaphragm valve member 62 which faces the pilot valve is greater than the surface area on the bottom side of the diaphragm 62 is exposed to the inlet passage 12. This being the case the force on the top side of the diaphragm valve member 62 is greater than the force on the bottom side of the valve member 62. Therefore, the diaphragm valve member 62 is in the closed position as illustrated in FIGS. 1 and 2.

Figure 4:
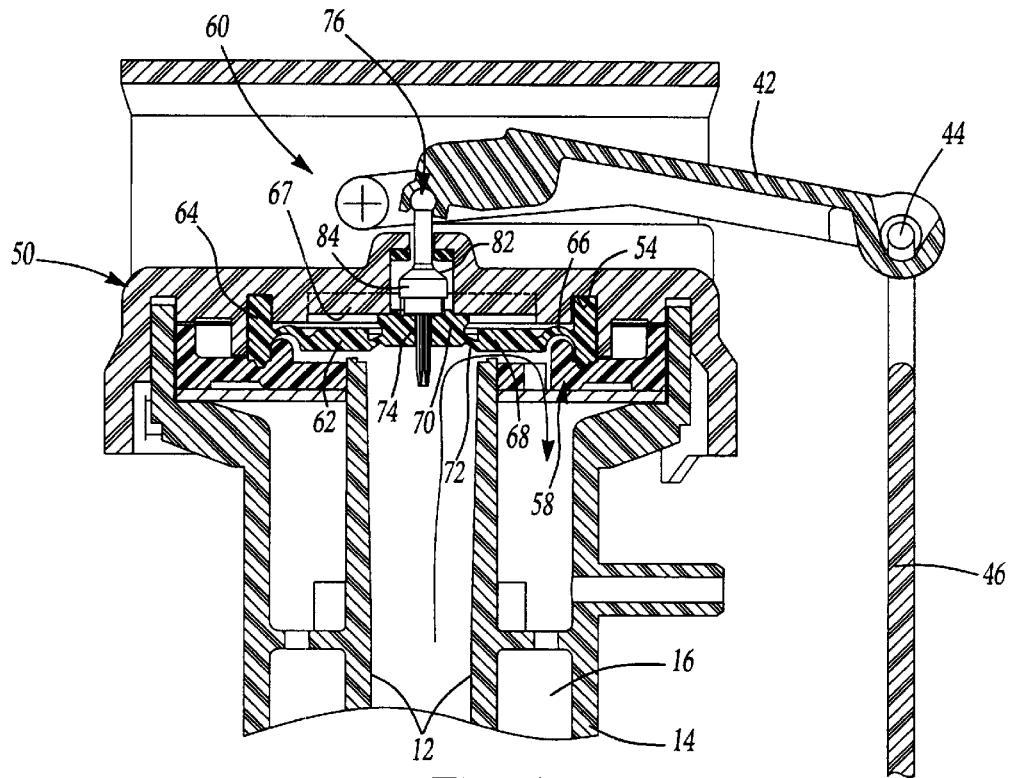
FIG. 4 is a view similar to FIG. 3 except that the pilot valve and the diaphragm valve are both in the open position.
Figure 5:
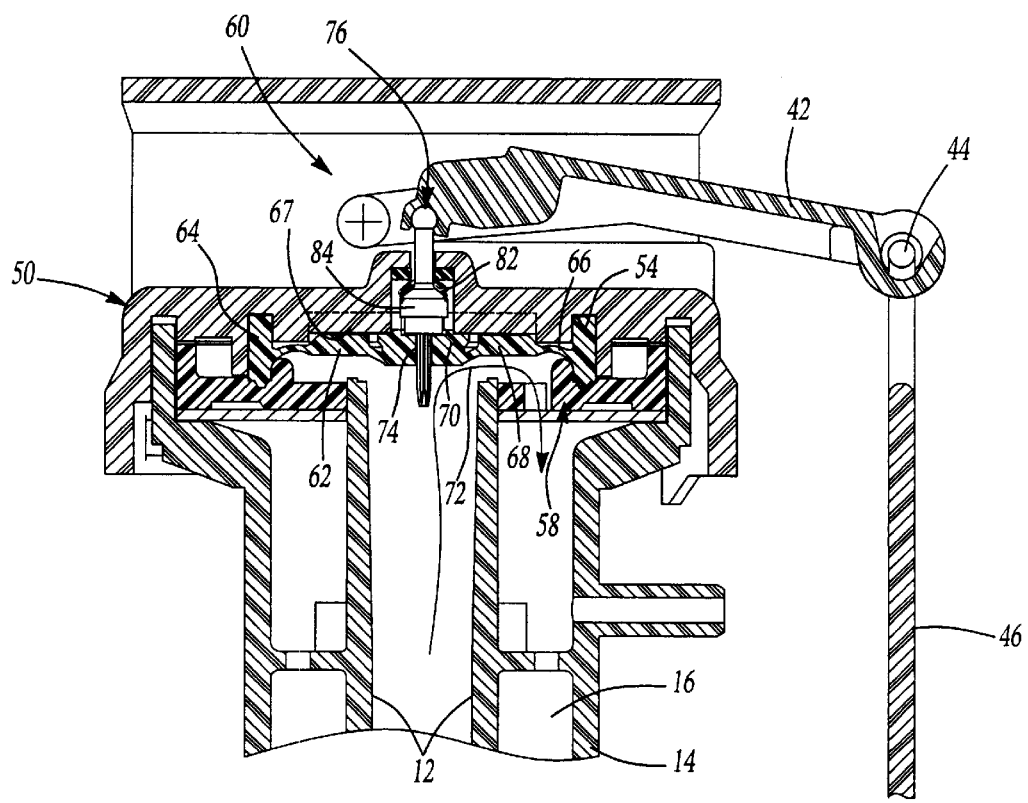
FIG. 5 is a cross-sectional view with the diaphragm valve open and the pilot valve closed by the float arm.

When the handle is actuated to lift the flapper valve the water level drops within the tank moving the float 48 down. As the float 48 moves down the end 44 of stem actuator member 42 is pulled downwardly by link 46. The downward movement of end 44 causes actuator member 42 to pivot with arm 42 engaging stem 78 and moving pilot valve member 76 as illustrated in FIGS. 3–4 to open vent port 80 which reduces the pressure in the pilot valve chamber 69 through vent port 80. As the pilot valve member 76 moves downwardly, the valve head 84 is designed to fully seal against the top of the diaphragm hub 70 to seal the aperture 74 although in practice some fluid leakage through the port 74 will continue until the diaphragm 62 seals off fluid flow. Unlike prior known pilot valves which use the valve stem to close the port, the valve head 84 seals against the seat above the port 74. With complete or substantial sealing of the port 80, the fluid pressure differential will be sufficiently altered behind the diaphragm to control its operation.

The outflow of water from pilot valve chamber results in a decrease in pressure on the top of the diaphragm valve member 62 resulting in a net upward force on the valve member 62. Due to the net upward force caused by the incoming line pressure, the diaphragm valve member 62 is moved to the open position as illustrated in FIG. 4.

With the diaphragm valve member 62 in the open position, water flows from the standpipe 12 into the discharge passage 16. Water flows into the tank through discharge ports 18 which are in communication with discharge passage 16. The water flowing out through discharge ports 18 replaces the water flowing from the tank into the toilet through the open flapper valve to flush the toilet. Upon sufficient water having flowed out of the tank through the flapper valve so as to reach a level low enough where the flapper valve no longer floats, the flapper valve drops to a closed position so that no more water flows out of the tank. With the flapper valve in the closed position the diaphragm valve member 62 still remains in the open position, thus allowing water to continue to flow into the tank. Since no water now flows out of the tank, while water continues to flow into the tank, the water level in the tank rises. The rising water level in the tank causes the float 48 to rise. At this position the end 44 of stem actuator member 42 is pushed upwardly by link 46. The upward movement of end 44 causes actuator member 42 to draw on stem 78. Pilot valve member 76 returns to its closed position as the valve head 84 seals to close passageway 80 as illustrated in FIGS. 1 and 2. The flow of water out of the vent valve chamber through vent port 80 ceases. The water pressure on the top side of diaphragm valve member 62 increases to a point where it exceeds the force of the water pressure in the bottom of valve member 62. This causes diaphragm valve member 62 to the closed position against the opening 22 of the standpipe 12.

The foregoing detailed description has been given for clearness of understanding only and no unnecessary limitations should be understood therefrom as some modifications will be obvious to those skilled in the art without departing from the scope and spirit of the appended claims.

What is claimed is:

1. A fill valve assembly comprising:

an upright standpipe for delivering flush water having an upper discharge end;

a diaphragm valve being disposed at said upper end of said standpipe, said diaphragm valve having a central hub with a throttle opening and an upper surface, said diaphragm valve being movable between a closed position engaged with said standpipe upper end and an open position at least partially spaced above said standpipe upper end so as to allow the flow of water therefrom, pilot valve means operatively associated with said diaphragm valve and a housing, said housing having a vent opening in the top and a unitary valve member reciprocally movable in said housing, said housing removably secured to said upper end of said standpipe while fixedly securing said diaphragm and forming a diaphragm chamber therebetween, said unitary valve member including a valve stem and a valve head, said valve stem extending upwardly through said vent opening and downwardly through said throttle opening to control the flow of fluid into said diaphragm chamber, said valve head selectively seating against a valve seat in an undersurface of said housing to selectively close said vent opening and selectively seating against at least a portion of said upper surface of said hub of said diaphragm valve to selectively close said throttle opening when said pilot valve means is moved from said pilot vent opening, said central hub upper surface being in constant sealing engagement with an interior portion of said housing in spaced coaxial position below said vent opening in all positions of said pilot valve means;

float for vertical movement between predetermined upper and lower positions in response to falling and rising water levels adjacent said standpipe;

actuator mounted on said housing for actuating said pilot valve means to provide for movement of said diaphragm valve between said open and closed positions, said actuator means comprising an actuator member engageable with said valve stem for movement of said valve member between a venting position wherein said valve head is moved off of said valve seat to open said vent opening such that water flows from said housing and closed position wherein said valve head seats against said valve seat to close said vent opening; and means connecting said actuator and said float for movement of said actuator means in response to vertical movement of said float means.

2. The fill valve assembly of claim 1 wherein said valve head connected to said stem has a diameter greater than said vent opening to prevent travel through said vent opening, said valve head selectively sealing in said valve seat to selectively close said vent opening.

3. The fill valve assembly of claim 2 wherein said valve member includes a secondary stem reciprocally extending through said diaphragm valve.

4. The fill valve assembly of claim 3 wherein said diaphragm valve has an annular rim flange for securing said diaphragm valve at the upper end of said standpipe, a central hub in cooperation with said valve member, and an annular diaphragm portion disposed between said annular rim flange and said central hub.

5. The fill valve assembly of claim 4 wherein said annular diaphragm portion is connected to said annular rim flange by a first flexible web and to said central hub by a second flexible web.

6. The fill valve assembly of claim 5 wherein said secondary stem of said valve member includes a plurality of longitudinal grooves to facilitate fluid flow past said secondary stem through said central hub of said diaphragm.

7. A toilet tank including a valve assembly comprising:

a vertical standpipe for delivering flush water having an upper discharge end;

a diaphragm valve being disposed at said upper end of said standpipe, said diaphragm valve being moveable between a closed position engaged with said standpipe upper end and an open position at least partially spaced above said standpipe upper end so as to allow the flow of water therefrom, said diaphragm valve having a central hub with a throttle opening and an upper surface;

pilot valve means operatively associated with said diaphragm valve and a housing, said housing having a vent opening in the top and a valve member movable in said housing, said housing removably secured to said upper end of said standpipe while fixedly securing said diaphragm and forming a diaphragm chamber therebetween, said valve member including a first valve stem portion extending upwardly through said vent opening, a valve head selectively seating against a valve seat in an underside of said housing and selectively seating against said upper surface of said hub to selectively close said pilot valve means, and a second valve stem portion extending downwardly through said throttle opening of said diaphragm hub, said second valve stem portion having fluid passageways for directing fluid from said standpipe through said central hub throttle opening of said diaphragm valve into said diaphragm chambers said central hub upper surface being in constant sealing engagement with an interior portion of said housing in spaced coaxial position below said vent opening in all positions of said pilot valve means;

float for vertical movement between predetermined upper and lower positions in response to falling and rising water levels adjacent said standpipe;

actuator mounted on said housing for actuating said pilot valve means to provide for movement of said diaphragm between said open and said closed positions, said actuator means comprising an actuator member engageable with said valve stem for selectively moving said valve member between a closed position with said valve head seated against said valve seat seating said vent opening and an open position allowing fluid flow through said vent opening; and means connecting said actuator and said float for movement of said actuator means in response to vertical movement of said float.

8. The fill valve assembly of claim 7 wherein said valve member includes a secondary stem reciprocally extending through said diaphragm valve.

9. The fill valve assembly of claim 8 wherein said diaphragm valve has an annular rim flange for securing said diaphragm valve at the upper end of said standpipe, a central hub in cooperation with said valve member, and an annular diaphragm portion disposed between said annular rim flange and said central hub.

10. The fill valve assembly of claim 9 wherein said annular diaphragm portion is connected to said annular rim flange by a first flexible web and to said central hub by a second flexible web.

11. The fill valve assembly of claim 10 wherein said secondary stem of said valve member includes a plurality of longitudinal grooves to facilitate fluid flow past said secondary stem through said central hub of said diaphragm.

* * * * *